United States Patent
David et al.

(10) Patent No.: US 11,591,702 B2
(45) Date of Patent: Feb. 28, 2023

(54) FLUORINATED MEMBRANE ARTICLES

(71) Applicant: 3M INNOVATIVE PROPERTIES COMPANY, St. Paul, MN (US)

(72) Inventors: Moses M. David, Wells, TX (US); Cedric Bedoya, Woodbury, MN (US); Jiyoung Park, Woodbury, MN (US); Amir Gharachorlou, Woodbury, MN (US); Mary I. Buckett, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 136 days.

(21) Appl. No.: 16/981,728

(22) PCT Filed: Mar. 12, 2019

(86) PCT No.: PCT/IB2019/051997
§ 371 (c)(1),
(2) Date: Sep. 17, 2020

(87) PCT Pub. No.: WO2019/180543
PCT Pub. Date: Sep. 26, 2019

(65) Prior Publication Data
US 2021/0040629 A1   Feb. 11, 2021

Related U.S. Application Data

(60) Provisional application No. 62/647,383, filed on Mar. 23, 2018.

(51) Int. Cl.
C25B 13/08 (2006.01)
C25B 13/04 (2021.01)
C25B 1/04 (2021.01)

(52) U.S. Cl.
CPC ............ *C25B 13/08* (2013.01); *C25B 1/04* (2013.01); *C25B 13/04* (2013.01)

(58) Field of Classification Search
CPC ............ C25B 1/04; C25B 13/04; C25B 13/08
See application file for complete search history.

(56) References Cited

U.S. PATENT DOCUMENTS 5,203,978 A   4/1993  Tsou
6,696,157 B1  2/2004  David
(Continued)

FOREIGN PATENT DOCUMENTS

WO   WO 2016-117170   7/2016
WO   WO 2018-185615   10/2018
(Continued)

OTHER PUBLICATIONS

International Search report for PCT International Application No. PCT/IB2019/051997 dated Jun. 19, 2019, 4 pages.

*Primary Examiner* — Alexander W Keeling
*Assistant Examiner* — Mofoluwaso S Jebutu
(74) *Attorney, Agent, or Firm* — Adrian L. Pishko; Qiang Han

(57) ABSTRACT

An article is provided that includes a substrate, a silicon containing layer on the substrate, and a layer including metallic Pt on the silicon containing layer. The silicon containing layer is a diamond-like glass layer. Optionally, the substrate is a porous membrane. In some cases, the silicon containing layer is a continuous layer.

12 Claims, 1 Drawing Sheet

(56) References Cited

U.S. PATENT DOCUMENTS

| | | | |
|---|---|---|---|
| 2005/0203978 A1 | 9/2005 | Abraham | |
| 2007/0020451 A1* | 1/2007 | Padiyath | H01L 51/5243 |
| | | | 428/408 |
| 2008/0213650 A1* | 9/2008 | Kohl | H01M 4/8825 |
| | | | 427/126.3 |
| 2017/0183789 A1* | 6/2017 | Matthews | C25B 9/19 |

FOREIGN PATENT DOCUMENTS

| | | |
|---|---|---|
| WO | WO 2018-185616 | 10/2018 |
| WO | WO 2018-185617 | 10/2018 |

\* cited by examiner

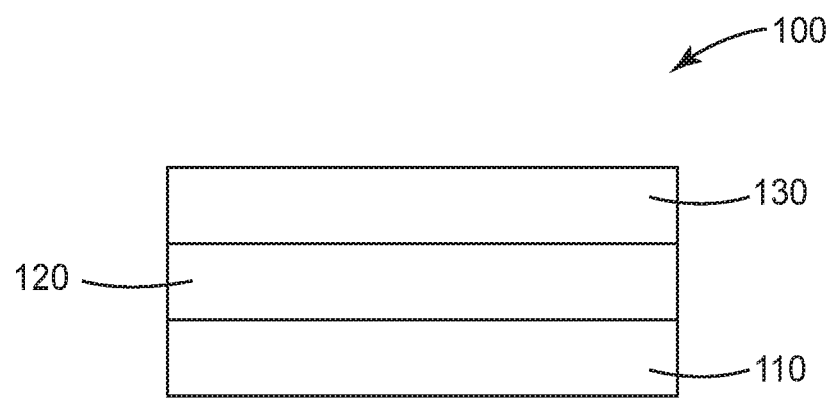

FLUORINATED MEMBRANE ARTICLES

CROSS REFERENCE TO RELATED APPLICATIONS

This application is a national stage filing under 35 U.S.C. 371 of PCT/IB2019/051997, filed Mar. 12, 2019, which claims the benefit of U.S. Application No. 62/647,383, filed Mar. 23, 2019, the disclosures of which are incorporated by reference in their entirety herein.

BACKGROUND

Proton exchange membrane (PEM) is often used in water electrolyzers. Water electrolyzers are common electrochemical devices for producing ultra-pure (e.g., typically, at least 99.9% pure) hydrogen from pure water. In the case of proton exchange membrane (PEM) based water electrolyzers, hydrogen can be obtained at high pressure. These electrolyzers often contain membrane electrode assemblies (MEAs) similar to proton exchange membrane electrode assemblies for fuel cells. PEM based water electrolyzers, however, produce hydrogen at the cathode via a hydrogen evolution reaction (HER) and oxygen at the anode via an oxygen evolution reaction (OER). The designation of the electrodes as anode or cathode in an electrochemical device follows the IUPAC convention that the anode is the electrode at which the predominant reaction is oxidation (e.g., the $H_2$ oxidation electrode for a fuel cell, or the water oxidation/$O_2$ evolution reaction electrode for a water or $CO_2$ electrolyzer).

Higher operating pressures on the water electrolyzer cathode (e.g., even approaching 50 bar) create a situation known in the field as hydrogen crossover, where the hydrogen gas ($H_2$) crosses from the cathode where it is produced through the PEM, back to the anode. This situation creates both an efficiency loss and in some situations an undesired amount of $H_2$ mixing with the anode gas ($O_2$) (e.g., exceeds 4 vol. %, which is about the lower explosive limit (LEL)).

There is a desire to a better membrane to mitigate this crossover of hydrogen to the anode.

SUMMARY

In one aspect, the present disclosure provides an article comprising: a substrate; a silicon containing layer on the substrate; and a layer comprising metallic Pt on the silicon containing layer.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

Definitions

For the following defined terms, these definitions shall be applied for the entire Specification, including the claims, unless a different definition is provided in the claims or elsewhere in the Specification based upon a specific reference to a modification of a term used in the following definitions:

The terms "about" or "approximately" with reference to a numerical value or a shape means +/− five percent of the numerical value or property or characteristic, but also expressly includes any narrow range within the +/− five percent of the numerical value or property or characteristic as well as the exact numerical value. For example, a temperature of "about" 100° C. refers to a temperature from 95° C. to 105° C., but also expressly includes any narrower range of temperature or even a single temperature within that range, including, for example, a temperature of exactly 100° C. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The terms "a", "an", and "the" include plural referents unless the content clearly dictates otherwise. Thus, for example, reference to a material containing "a compound" includes a mixture of two or more compounds.

The term "diamond-like glass" (DLG) refers to substantially or completely amorphous glass including carbon and silicon, and optionally including one or more additional components selected from the group including hydrogen, nitrogen, oxygen, fluorine, sulfur, titanium, and copper. Other elements may be present in certain embodiments. The amorphous diamond-like glass films may contain clustering of atoms to give it a short-range order but are essentially void of medium and long range ordering that lead to micro or macro crystallinity which can adversely scatter radiation having wavelengths of from 180 nanometers (nm) to 800 nm.

BRIEF DESCRIPTION OF THE DRAWINGS

The disclosure may be more completely understood in consideration of the following detailed description of various embodiments of the disclosure in connection with the accompanying figures, in which:

FIG. 1 is a schematic of an exemplary article described herein.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

High quality platinum deposition by chemical vapor deposition (CVD) request the use of hydrogen to lower the amount of impurities such as C and O. Another useful effect of $H_2$ is to decrease the temperature required for CVD down to 200-300° C. However, hydrogen is reacting with the fluorinated substrates, thus inhibiting the Pt deposition by forming HF. The present application provides a fluoropolymer-based composite layer membrane article, which includes a silicon containing layer used as a protective coating to limit the formation of HF during the CVD process. The article of the present application can also act an as hydrogen crossover mitigator for proton exchange membrane (PEM) water electrolyzer via catalytic recombination of $H_2$ (g) and $O_2$ (g).

FIG. 1 is a schematic side view of one embodiment of article 100. The article 100 can include a substrate 110, a silicon containing layer 120 on the substrate 110 and a layer 130 including metallic Pt on the silicon containing layer 120. In some embodiments, the silicon containing layer 130 can be a continuous silicon containing layer.

The substrate 110 described herein may comprise any suitable polymer. Exemplary polymer are typically fluorinated. The polymer may be a polytetrafluoroethylene (PTFE). The polymer typically has an equivalent weight (EW) up to 1200 (in some embodiments, up to 1100, 1000, 900, 825, 800, 725, or even up to 625).

The polymer can be formed into the substrate by any suitable method. The polymer is typically cast from a suspension. Any suitable casting method may be used, including bar coating, spray coating, slit coating, and brush coating. Alternately, the substrate may be formed from neat polymer in a melt process such as extrusion. After forming, the substrate may be annealed, typically at a temperature of at least 120° C. (in some embodiments, at least 130° C., 150° C., or higher). The substrate typically has a thickness up to 250 micrometers (in some embodiments, up to 225 micrometers, 200 micrometers, 175 micrometers, 150 micrometers, 100 micrometers, or even up to 50 micrometers)

In some embodiments, the substrate may be a porous membrane. The substrate can include a support matrix consisting of a porous network of interlinked fibers that will provide the ion exchange polymer (ionomer) with additional mechanical strength to withstand the sometimes large pressure differentials across the substrate due to the high pressure of the cathode side during hydrogen evolution. The support matrix can be made of an expanded polytetrafluoroethylene (e.g., that available under the trade designation "TEFLON" from DuPont Chemicals, Wilmington, Del.), or a partially fluorinated fibrous matrix that will be stable in the acidic environment of the ionomer.

In some embodiments, the substrate may be carbon nanofibers or carbon microfibers. Carbon nanofibers and carbon microfibers are available, for example, from Pyrograf Products, Inc., Cedarville, Ohio, under the trade designation "PYROGRAF-III." In some embodiments, the substrate may be any suitable nonwoven material.

The silicon containing layer 120 can be a SiOCH layer formed on the substrate 110. The SiOCH layer may comprise $SiO_xC_zH_y$. The SiOCH layer can be a diamond-like glass (DLG) layer. The DLO may be created by depositing a dense random covalent system comprising carbon, silicon, hydrogen, and oxygen under ion bombardment conditions by locating the substrate on a powered electrode in a radio frequency ("RF") chemical reactor. The SiOCH layer contains at least about 30 atomic percent carbon, at least about 25 atomic percent silicon, and less than or equal to about 45 atomic percent oxygen.

Pt, for example, metallic is typically deposited on the silicon containing layer 120 via chemical vapor deposition (CVD) to form the layer comprising metallic Pt. In some embodiments, the metallic Pt is collectively present in the article at a concentration in a range from 0.0001 $mg/cm^3$ to 100 $mg/cm^3$ (in some embodiments, in a range from 0.05 $mg/cm^3$ to 100 $mg/cm^3$, 1 $mg/cm^3$ to 75 $mg/cm^3$, or even 5 $mg/cm^3$ to 50 $mg/cm^3$).

In some embodiments, the metallic Pt is distributed throughout the layer comprising metallic Pt. In some embodiments, the layer comprising metallic Pt can be a discontinuous layer. In some embodiments, the discontinuous layer of metallic Pt can have a plurality of island-like regions of the metallic Pt. The "island-like regions" of metallic Pt that make up the discontinuous layer may have all dimensions (for example, nanoparticle diameter or atom cluster diameter) in a range of up to (i.e., less than or equal to) 100 nm in average size (in some embodiments, up to 20 nm in average size, up to about 10 nm in average size, or even up to about 2 nm in average size). In some embodiments, the island-like regions of metallic Pt are at least 0.1 nm in at least one dimension (in some embodiments, at least 0.5 nm in at least one dimension), and no greater than the above-described upper limits.

The following embodiments are intended to be illustrative of the present disclosure and not limiting.

Embodiments

The following working examples are intended to be illustrative of the present disclosure and not limiting.

Embodiment 1 is an article comprising: a substrate; a silicon containing layer on the substrate; and a layer comprising metallic Pt on the silicon containing layer.

Embodiment 2 is the article of claim 1, wherein the silicon containing layer is a continuous layer.

Embodiment 3 is the article of any one of claims 1 to 2, wherein the silicon containing layer comprises $SiO_xC_zH_y$.

Embodiment 4 is the article of any one of claims 1 to 3, wherein the silicon containing layer is a diamond-like glass layer.

Embodiment 5 is the article of any one of claims 1 to 4, wherein the substrate is a porous membrane.

Embodiment 6 is the article of any one of claims 1 to 5, wherein the substrate comprises a polymer, a nonwoven or a carbon fiber.

Embodiment 7 is the article of claim 6, wherein the polymer is a fluorinated polymer.

Embodiment 8 is the article of claim 7, wherein the fluorinated polymer is polytetrafluoroethylene.

Embodiment 9 is the article of claim 6, wherein the carbon fiber is selected from at least one of carbon nanofibers and carbon microfibers.

Embodiment 10 is the article of any one of claims 1 to 9, wherein metallic Pt is distributed throughout the layer comprising metallic Pt.

Embodiment 11 is the article of any one of claims 1 to 10, wherein the metallic Pt is collectively present in the article at a concentration in a range from 0.0001 mg/cm$^3$ to 100 mg/cm$^3$.

Embodiment 12 is the article of any one of claims 1 to 11, wherein the layer comprising metallic Pt is a discontinuous layer.

Embodiment 13 is the article of claim 12, wherein the discontinuous layer of metallic Pt comprises a plurality of island-like regions of the metallic Pt.

EXAMPLES

Materials

An expanded polytetrafluoroethylene (ePTFE) membrane AX15-064 (formerly named AX12-094), commercially available under the trade designation "TETRATEX membrane" from Donaldson Company, Inc., (Ivyland, Pa., USA) was used in these examples.

Scanning Transmission Electron Microscopy (STEM)

Specimens suitable for TEM analysis were prepared by cryo-ultramicrotomy. Thin sections of the sample (roughly 1 mm$^2$ area by 80-90 nm thick) were cut using a diamond knife on a Leica Ultramicrotome set at −60° C. These thin cryo-cut sections were floated onto the surface of a DMSO/H2O (60:40) mixture and then collected onto a standard 3 mm TEM grid.

Representative images of the cross-section in both bright field (BF) mode and High Angle Annular Dark Field (HAADF) mode were obtained using Scanning Transmission Electron Microscopy (STEM) in a ThermoFisher Tecnai Osiris transmission electron microscope (TEM) operating at 200 kV. HAADF imaging generates a dark field image (using the high-angle scattered electrons only). The images are formed by collecting the scattered electrons with an annular dark-field detector. Annular dark field images formed only by very high angle, incoherently scattered electrons (as opposed to Bragg scattered electrons) are highly sensitive to variations in the average atomic number in the sample. Thus, HAADF images can be used to obtain compositional information about the sample. X-ray mapping of the elemental composition was performed in the TEM using the Bruker Espirit Super-X quad x-ray SDD (silicon drift detector) and accompanying analysis software system.

Elemental Composition

The surfaces of the samples were examined using X-ray Photoelectron Spectroscopy (XPS), also known as Electron Spectroscopy for Chemical Analysis (ESCA), to determine the surface composition of the samples in the outermost 3 to 10 nanometers (nm) using the equipment and parameters listed in Table 1. XPS is sensitive to all elements in the periodic table except hydrogen and helium with detection limits for most species in the 0.1 to 1 atomic % concentration range. Intensities of the measured photoelectron peaks from survey scans were integrated and converted to atomic concentrations using the relative sensitivity factors provided by the instrument manufacturer. The spectra were analyzed by software CasaXPS version 2.3.16 PR 1.6 (Casa Software Ltd).

TABLE 1

| XPS analysis conditions. | |
|---|---|
| Instrument | Kratos Axis Ultra ™ |
| analysis areas | Approximately 300 μm by 700 μm |
| photoelectron take off angle | 90° (normal emission) ± 10° solid angle of acceptance |
| x-ray source | Monochromatic Al K (1486.6 eV) 140 W |
| charge neutralization | Low energy e- flood source |
| charge correction | F 1 s peaks of samples at 690.0 eV |
| analysis chamber pressure | ~8 × 10−8 Torr |

Example 1

Pt/DLG Coated Porous e-PTFE Membrane at 300° C. Using (CH$_3$)$_3$CH$_3$C$_5$H$_4$Pt Source A diamond-like glass (DLG) coating was deposited on an e-PTFE membrane in a commercial plasma system. The commercial batch plasma system (Plasmatherm Model 3032) is configured for reactive ion etching (RIE) with a 27-inch lower powered electrode and central gas pumping. The chamber is pumped by a roots blower (Edwards Model EH1200) backed by a dry mechanical pump (Edwards Model iQDP80). RF power is delivered by a 3 kW, 13.56 Mhz solid-state generator (RFPP Model RF30S) through an impedance matching network. The system has a nominal base pressure of 5 mTorr. The flow rates of the gases are controlled by MKS flow controllers. Substrates for deposition are placed on the lower powered electrode.

Samples were placed on the powered electrode of the batch plasma apparatus. Air was evacuated from the chamber using a combination of a mechanical vacuum pump and a Roots blower vacuum pump to a base pressure lower than 10 mTorr before igniting the plasma. The radio frequency (if) power was 13.56 MHz at 1000 W. DLG film was deposited using a mixture of 360 standard cubic centimeters per minute (sccm) of tetramethylsilane (TMS) and 90 sccm of O$_2$. After the gases were mixed well in the chamber, discharge was ignited using 500 W power for 60 seconds. A subsequent plasma treatment of oxygen was applied without breaking the vacuum using 500 sccm of oxygen at 500 W for 60 seconds. The plasma resulted in the deposition of an α-C:H:Si:O surface of DLG which inhibits the formation of HF during the Pt CVD coating. The plasma treatment was performed on both sides of the membrane.

The membrane was then placed in a tube furnace with controlled atmosphere. This tube furnace held a 6-inch diameter quartz tube connected to a scroll pump equipped with a chemical filter. Nitrogen or argon can be used as carrier or reactive gases. For a platinum source, 0.5 g of trimethyl(methylcyclopentadienyl) platinum (IV) (98% purity) from Sigma-Aldrich (St. Louis, Mo.) was placed in the quartz tube but outside the tubular furnace.

The pressure inside the quartz tube was reduced to mTorr range. The temperature of the furnace was increased from room temperature to 300° C. A mixture of hydrogen (20 sccm) and argon (20 sccm) was then introduced into the evacuated quartz tube. A pressure of 5 torr was maintained using a pressure control butterfly valve. The Pt source was vaporized around 30° C. using a separate heater wrapped around the quartz tube allowing deposition on the porous membrane fibers until the Pt source was evaporated completely.

After the deposition was complete, the Pt/DLG-coated e-PTFE membrane was analyzed using XPS as described above. The values of three areas were averaged and are provided in Table 2.

TABLE 2

Results of XPS analysis of the Pt/DLG-coated e-PTFE membrane of Example 1.

| Sample | C % | F % | N % | O % | Pt % | S % | Si % |
|---|---|---|---|---|---|---|---|
| Bare membrane | 30.1 ± 3.0 | 69.7 ± 4.0 | — | 0.1 ± 0.1 | — | — | — |
| Coated membrane | 34.7 ± 3.0 | 17.2 ± 1.0 | 0.4 ± 1.0 | 23.4 ± 2.0 | 12.7 ± 1.0 | 0.1 ± 0.1 | 11.4 ± 2.0 |

A SEM image showed that the Pt/DLG coating was uniform on the fiber surface and did not clog the e-PTFE membrane.

Cross-section STEM showed that the Pt coating existed as discrete 'islands' on the surface of the membrane fibers. The individual 'islands' appeared to be crystalline and were in the size range of 10 nm.

Comparative Example 1

Platinum Deposition on e-PTFE Membrane without DLG

A comparative example was prepared using the e-PTFE membrane and platinum-deposition method provided in Example 1, but no DLG coating was applied prior to the platinum deposition process. In this Comparative Example, no platinum deposition on the e-PTFE membrane occurred and the e-PTFE membrane shrank during processing.

Example 2

Pt/DLG Coated Porous e-PTFE Membrane at 200° C. Using $(CH_3)_2(COD)Pt$ Source

An e-PTFE membrane was coated with DLG using the method described in Example 1. Platinum was then deposited on the DLG-coated e-PTFE membrane using dimethyl (1,5-cyclooctadiene) platinum (Gelest, Inc., Morrisville, Pa.) as the platinum source.

In the tube furnace arrangement described in Example 1, 0.4 g of dimethyl(1,5-cyclooctadiene) platinum (II) was placed in the quartz tube but outside the tubular furnace. The pressure inside the quartz tube was reduced to mTorr range. The temperature of the furnace was increased from room temperature to 200° C. A mixture of hydrogen (2 sccm) and argon (40 sccm) was introduced into the vacuum quartz tube. A pressure of 5 torr was maintained using a pressure control butterfly valve. The Pt source was vaporized around 50° C. allowing deposition on the porous membrane fibers. STEM-HAADF imaging with x-ray mapping showed good uniformity of the Pt layer to the DLG coated e-PTFE membrane.

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. An article comprising:
    a substrate;
    a silicon containing layer on the substrate, wherein the silicon containing layer is a diamond-like glass layer; and
    a layer comprising metallic Pt on the silicon containing layer.

2. The article of claim 1, wherein the silicon containing layer is a continuous layer.

3. The article of claim 1, wherein the silicon containing layer comprises $SiO_xC_zH_y$.

4. The article of claim 1, wherein the substrate is a porous membrane.

5. The article of claim 1, wherein the substrate comprises a polymer, a nonwoven or a carbon fiber.

6. The article of claim 5, wherein the polymer is a fluorinated polymer.

7. The article of claim 6, wherein the fluorinated polymer is polytetrafluoroethylene.

8. The article of claim 5, wherein the carbon fiber is selected from at least one of carbon nanofibers and carbon microfibers.

9. The article of claim 1, wherein metallic Pt is distributed throughout the layer comprising metallic Pt.

10. The article of claim 1, wherein the metallic Pt is collectively present in the article at a concentration in a range from 0.0001 $mg/cm^3$ to 100 $mg/cm^3$.

11. The article of claim 1, wherein the layer comprising metallic Pt is a discontinuous layer.

12. The article of claim 11, wherein the discontinuous layer of metallic Pt comprises a plurality of island-like regions of the metallic Pt.

* * * * *